Patented Sept. 6, 1932

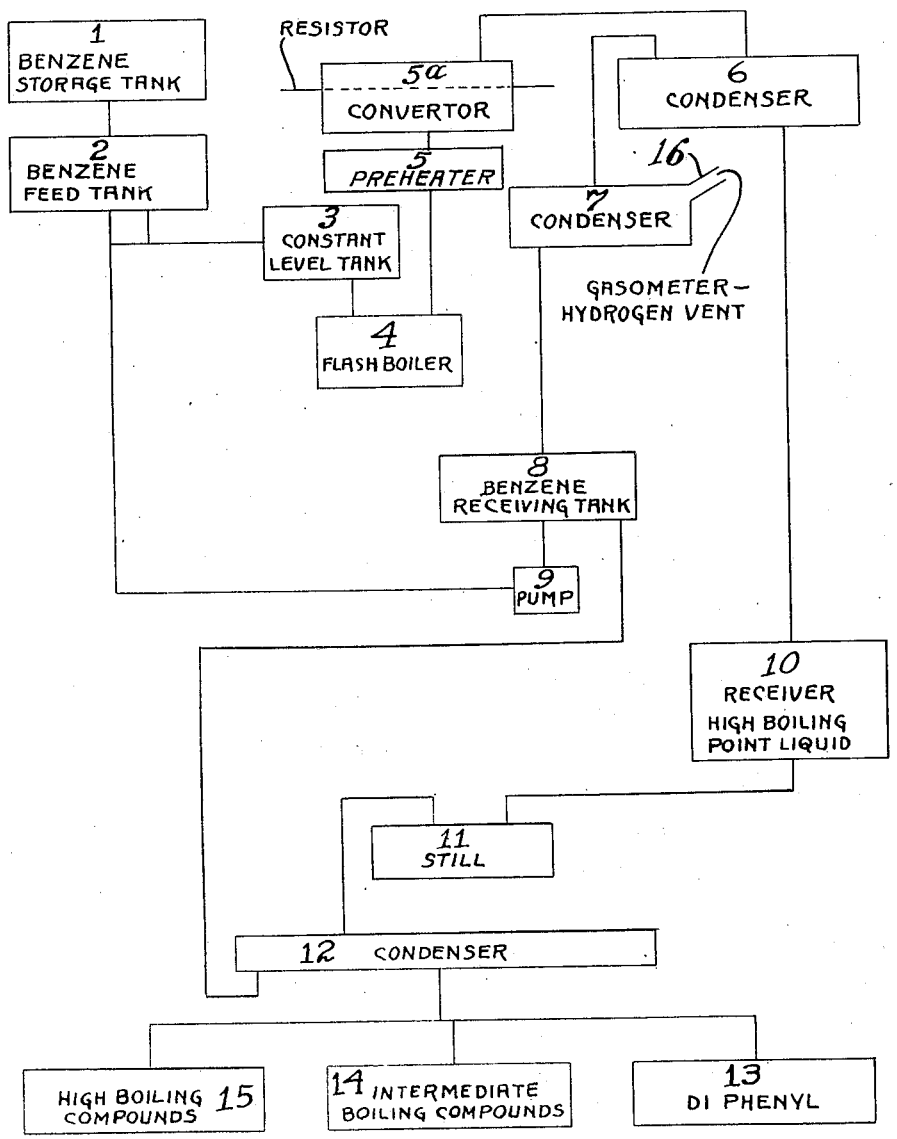

1,875,317

UNITED STATES PATENT OFFICE

JOHN N. CAROTHERS, OF ANNISTON, ALABAMA, ASSIGNOR TO SWANN RESEARCH, INC., A CORPORATION OF ALABAMA

PROCESS FOR PRODUCING DIPHENYL   REISSUED

Application filed April 7, 1928. Serial No. 268,096.

My invention relates to a method for the commercial production of diphenyl from benzene, or the commercially known product, benzol, by the employment of heat to raise the temperature of the benzol to that at which diphenyl is formed, and has for its object the provision of such a process whereby a high yield of diphenyl may be obtained and a high percentage of diphenyl formed during a single pass of benzene vapors over the heated surface.

A further object of my invention is to provide a process for the commercial production of diphenyl from benzol in which benzol vapors are passed over a heated surface to raise them to the temperature at which diphenyl is formed, and wherein objectionable deposits of tar and carbon on the heated surface are practically eliminated.

A still further object of my invention is to provide a process of the character designated for the commercial production of diphenyl from benzol, wherein the unreacted benzol at each pass over the heated surface is recovered and re-treated until it is all reacted upon.

Heretofore, so far as I am aware, diphenyl has only been produced in small quantities in a chemical laboratory. Various methods of diphenyl preparation have been suggested, such as suspending electric heating coils in a flask containing liquid benzene and benzene vapors, or by passing benzene vapor through an externally heated tube. Diphenyl has also been produced by the preparation from solution, such as by adding copper to a solution of diazo benzene sulphate in alcohol, or by heating mono brombenzene or mono chlorbenzene with sodium. In such instances where benzene vapors were heated, the rate of flow of the vapors was uncontrolled, and the heating regulation likewise was uncontrolled.

In my investigations of the preparation of diphenyl from benzene, in which the vapors are passed through a hot tube, I have encountered all the difficulties, reported by previous investigators, as regards stopping of the tube with carbon, and the formation of tarry bodies. In such references as I have noted, frequent mention is made of the formation of tar and carbon, and the necessity of frequently cleaning out the tubes when benzene vapors are passed through heated tubes. I have observed that under certain conditions tar is formed and carbon is deposited, and when deposited on the heating surface, greatly reduces the yield of diphenyl from the process. I have discovered a means of preventing such deposition of carbon, and of lowering the quantity of tar or other high boiling compounds which are formed, until their presence is neither an objection to the continuous operation of the process, nor a source of great loss of benzene.

By the method of operation which I employ, I am enabled to control the various factors which I have found it is necessary to have under control, and as a result of this control I am enabled to carry on a commercial operation of this process and obtain a satisfactory yield of diphenyl from the benzene. By satisfactory yield, I mean at least 8% diphenyl in the total condensate after one pass.

Although external means of heating may be applied, and satisfactory results obtained, I have found internal heating, i. e. heating the gas stream by means of metallic resistors with electric current to be more satisfactory. It is obvious that internal heating may be accomplished by induction, instead of by resistance. Further I have found that metallic resistors, rather than non-metallic resistors, are better suited for this purpose. While non-metallic resistors are satisfactory for short periods, the electrical resistance drops very rapidly, and in a short time, such non-metallic resistors as have been tested are unsatisfactory because of this change of resistance. Although other metals may be used as a metallic resistor, I have found that nichrome is very satisfactory. The heating surface may be arranged as desired, according to the form of the material used.

My research in the production of diphenyl has led to the conclusion that the formation of tar and carbon on the heating elements employed for raising the temperature of the benzene vapors, has been largely due to the undue length of time in which these vapors were in contact with the heating element which raises the temperature of the vapors to the reaction temperature at which diphenyl is formed. I have found that if the vapors may be quickly raised to the optimum temperature at which diphenyl is formed, these depositions of tar and carbon do not occur to an extent which is objectionable to the operation of the process. In order to minimize the formation of tar and carbon, I have found that if the vapors be first raised to the highest temperature permissible, without the formation of appreciable quantities of diphenyl, and then suddenly subjected to a surface capable of quickly raising the temperature of the vapors to that at which diphenyl is formed, the time element during which the vapors are in contact with the highly heated surface is greatly reduced and no objectionable deposits of tar and carbon are formed on the highly heated surface. By this method I am enabled to maintain a relatively high velocity over the most highly heated surface so that the vapors pass thereover so quickly that no deposits are formed. Should tarry compounds be formed, the fact that they are forming may be observed by an increase in the flow of hydrogen and other uncondensed gases from the gas outlet of the reaction system.

In order to prevent reversal of the reaction, and, as a result, obtain an increased yield of diphenyl, I have found that, immediately the vapors have reached the reaction temperature, they should be quickly cooled to a temperature considerably below that at which the reaction occurs. Otherwise the diphenyl will combine with hydrogen during the cooling period and re-form benzene. The preheating of the vapors followed by the passing of the vapors over a highly heated element at a relatively high velocity to produce the reaction is of material aid in bringing about the quick cooling feature of my process. This, for the reason that at the relatively high velocity the vapors are immediately subjected to a cooling process in a condenser which should be located as near as possible to the converter in which the reaction occurs.

While I do not know the exact extent to which water may be present in commercially pure benzol, without causing trouble in the formation of carbon, nevertheless, I have found water an objection if it is present in such quantities as to separate from the benzol. In view of this observed fact that carbon forms more readily when water is present, than when dry benzol is used, I prefer using water free benzol.

While benzol may be used which is of a grade designated as "90% commercial", I have found that the use of this grade of benzol is not satisfactory where it is sought to obtain diphenyl alone, because of the wide boiling range of the product; and as a result of the presence of other compounds that benzene, lower yields of diphenyl are obtained. Also difficulties are encountered in separating the diphenyl from reaction products of these other compounds.

Benzol designated as "90% commercial" contains certain percentages of other aromatic hydrocarbons, especially toluene and xylene. These hydrocarbons, along with the benzene, when treated in accordance with my improved process, produce complex di-aryl compounds which are the "other compounds" referred to above. For certain purposes, the complex mixture obtained by treating the benzol designated as "90% commercial" in my improved process is superior to pure diphenyl. On the other hand, when diphenyl with a minimum of the complex di-aryl compounds is to be produced, it is preferable to use a commercial grade of benzol, designated as "commercially pure". This grade of benzol is of sufficient purity and boils within a 2° C. range, which range includes the true boiling point of benzene.

In order that my process may be more readily understood, reference will be had to the accompanying diagrammatic drawing outlining the steps thereof. Liquid benzol is fed from a constant level tank 3 into a flash boiler 4, where the benzol is vaporized and passes to a preheater 5 where it is preheated and then passed into a converter 5a, which is provided with means for heating the vapors to the temperature necesasry for the formation of diphenyl according to the following equation:

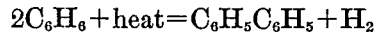

$$2C_6H_6 + \text{heat} = C_6H_5C_6H_5 + H_2$$

The preheater may be of any approved type and may gradually or quickly raise the temperature of the vapors to the highest point permissible at which no appreciable reactions occur. I have found that a temperature of from 600° to 650° C., is the optimum temperature for practical purposes. Upon leaving the preheater, the vapors pass, at a relatively high velocity, immediately into the converter where they come in contact with a heated surface, which may comprise an electrically heated screen or other suitable surface maintained at a temperature of from 750° to 800° C., the optimum temperature at which diphenyl is formed. The vapors are here raised to a temperature substantially equal to that of the heated surface.

Inasmuch as the vapors, before passing over this surface, have already been raised to a temperature of from 600° to 650° C., there is added only a relatively small amount of heat to the vapors. This being the case, a relatively high velocity of the vapors may be maintained across the heated surface, thus minimizing the occurrence of side reactions and deposits of tar and carbon.

From the converted 5a the mixed vapors of benzol, diphenyl, di-aryl compounds and hydrogen pass into condenser 6, which is provided with regulated means for quickly cooling the vapors sufficiently to condense the diphenyl and such other compounds as are formed when the benzol vapors are heated. The diphenyl and other compounds together with some benzol are drawn off into a receiver 10, from which it flows into a still 11, from whence separation is effected by a condenser 12, in which the fractions are separated into high boiling compounds, collected in a tank 15, the intermediate boiling compounds into a tank 14; and the diphenyl into a tank 13. The benzol condensed with the diphenyl in condenser 6 is recondensed in the condenser 12 and passes to the receiving tank 8. The diphenyl and di-aryl compounds are then ready for use in whatever form is desired.

In order to make the process a cyclic operation, the benzol vapors and hydrogen from the condenser 6 pass into a condenser 7, where liquid benzol is collected and flows into a receiving tank 8, while the hydrogen is vented through a gasometer 16. The liquid benzol is returned by a pump 9 through benzol tank 2 to the constant level tank 3, and thence again through the cycle. As the benzol is converted according to the process described, additional benzol is admitted into the system from storage tank 1.

While I have described my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The herein described continuous process for the production and separation of diphenyl which comprises vaporizing benzol, preheating said vapors to at least 600° C., passing said preheated benzol vapor over a surface which is heated to a temperature which will decompose benzene and form substantial quantities of diphenyl, condensing said diphenyl and other compounds and unreacted benzol, separating said condensate from hydrogen and uncondensed gases, and then separating said diphenyl from such accompanying compounds as may occur.

2. The process of producing benzol derivatives which comprises vaporizing the benzol, preheating the vapors to the maximum temperature at which substantially no derivatives are formed, and then passing the preheated vapors through a higher temperature heating zone to raise the temperature of said vapors to that at which substantial quantities of said derivatives are formed.

3. The process of producing benzol derivatives which comprises vaporizing the benzol, preheating the vapors to the maximum temperature at which substantially no derivatives are formed, then raising the temperature of said vapors to that at which substantial quantities of said derivatives are formed, and immediately cooling said vapors to prevent reversal of the process.

4. The process of making diphenyl which comprises heating benzol vapor to a temperature below but approaching the decomposition temperature of the benzol, and delivering the heated benzol vapor into contact with a heating medium maintained at a temperature sufficient to decompose the benzol.

5. The process of producing diphenyl from benzol which comprises preheating benzol vapors to the highest permissible temperature without the formation of substantial quantities of diphenyl, and then passing said vapors through a heating zone effective to raise the temperature of the vapors to that at which the benzol is decomposed and diphenyl formed.

6. The herein described process for the production of benzol derivatives which consists in preheating a stream of benzol vapor to a temperature below but approaching the decomposition temperature of the benzol, and then passing the thus preheated vapors over a surface heated to a temperature exceeding 700° C. and below 800° C. to raise them to the decomposition temperature of benzol.

7. The herein described process for the production of benzol derivatives which consists in preheating a stream of benzol vapor to a temperature below but approaching the decomposition temperature of the benzol, then passing the thus preheated vapors over a surface heated to a temperature exceeding 700° C. and below 800° C. to raise them to the decomposition temperature of benzol, condensing the diphenyl and returning the unreacted benzol for subsequent heat treatment.

8. The process of producing diphenyl which consists in heating benzol vapors to a temperature of from 600° C. to 650° C., and then passing said vapors thus heated into contact with a heating medium maintained at a temperature above 700° C. and below 800° C. to decompose them and form diphenyl.

9. The process of producing diphenyl which consists in heating benzol vapors to a temperature of from 600° C. to 650° C., then passing said vapors thus heated into contact with a heating medium maintained at a temperature above 700° C. and below 800° C. to decompose them and form diphenyl, and immediately cooling the vapors.

10. The process of producing diphenyl which consists in heating benzol vapors to a temperature of from 600° C. to 650° C., and then passing said vapors thus heated into contact with a heating medium maintained at a temperature around 750° C. to decompose them and form diphenyl.

11. The process of producing diphenyl which consists in heating benzol vapors to a temperature of from 600° C. to 650° C., then passing said vapors thus heated into contact with a heating medium maintained at a temperature around 750° C. to decompose them and form diphenyl, and immediately cooling the vapors.

12. In a process of producing diphenyl by heating benzol vapors, passing a stream of the vapors over an element heated to diphenyl forming temperatures and at a velocity sufficient to prevent the formation of tar and carbon until their presence neither interferes with the continuous operation of the process nor constitutes a source of a material loss of benzol.

13. The process of producing diphenyl which consists in passing a stream of benzol vapor in contact with a surface heated to a temperature which will decompose the benzol and form diphenyl and at a velocity sufficient to prevent the formation of tar and carbon until their presence neither interferes with the continuous operation of the process nor constitutes a source of a material loss of benzol.

14. The process of producing diphenyl which consists in passing a stream of benzol vapor over a surface heated to a temperature which will decompose the benzol and form diphenyl and at a velocity sufficient to prevent the formation of tar and carbon until their presence neither interferes with the continuous operation of the process nor constitutes a source of a material loss of benzol, and condensing the diphenyl and unreacted benzol.

15. The process of producing diphenyl which consists in passing a stream of benzol vapor over a surface heated to a temperature which will decompose the benzol and form diphenyl and at a velocity sufficient to prevent the formation of tar and carbon until their presence neither interferes with the continuous operation of the process nor constitutes a source of a material loss of benzol, condensing the diphenyl and unreacted benzol, and separating the diphenyl from the condensed benzol.

JOHN N. CAROTHERS.